(12) United States Patent
Jansson

(10) Patent No.: US 10,584,545 B2
(45) Date of Patent: Mar. 10, 2020

(54) DRILL STRING WITH BEND RESISTANT COUPLING

(71) Applicant: SANDVIK INTELLECTUAL PROPERTY AB, Sandviken (SE)

(72) Inventor: Tomas Sh Jansson, Gavle (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 496 days.

(21) Appl. No.: 14/917,267

(22) PCT Filed: Aug. 27, 2014

(86) PCT No.: PCT/EP2014/068121
§ 371 (c)(1),
(2) Date: Mar. 7, 2016

(87) PCT Pub. No.: WO2015/032659
PCT Pub. Date: Mar. 12, 2015

(65) Prior Publication Data
US 2016/0215572 A1     Jul. 28, 2016

(30) Foreign Application Priority Data

Sep. 9, 2013     (EP) ..................................... 13183497

(51) Int. Cl.
| E21B 17/042 | (2006.01) |
| E21B 1/00 | (2006.01) |
| F16L 15/00 | (2006.01) |

(52) U.S. Cl.
CPC .............. *E21B 17/042* (2013.01); *E21B 1/00* (2013.01); *E21B 17/0426* (2013.01); *F16L 15/00* (2013.01)

(58) Field of Classification Search
CPC .... F16L 15/00; E21B 17/042; E21B 17/0426; E21B 1/00; Y10T 403/68
USPC .................................. 285/333, 334; 403/343
See application file for complete search history.

(56) References Cited

U.S. PATENT DOCUMENTS

| 3,067,593 | A |  | 12/1962 | Gresham | |
| 3,537,738 | A |  | 11/1970 | Fischer et al. | |
| 3,876,319 | A | * | 4/1975 | Meyer | ................. E21B 17/0426 |
|  |  |  |  |  | 403/343 |
| 4,003,669 | A | * | 1/1977 | Fenske | ................ E21B 17/0426 |
|  |  |  |  |  | 403/343 X |
| 4,076,436 | A |  | 2/1978 | Slator et al. | |
| 4,249,831 | A | * | 2/1981 | Sable | .................. E21B 17/0426 |
|  |  |  |  |  | 403/343 X |
| 4,332,502 | A |  | 6/1982 | Wormald et al. | |
| 4,398,756 | A |  | 8/1983 | Duret et al. | |
| 4,430,787 | A | * | 2/1984 | Paramore | ............ E21B 17/0426 |
|  |  |  |  |  | 403/343 X |

(Continued)

FOREIGN PATENT DOCUMENTS

| EP | 0220147 A2 | 4/1987 |
| RU | 2312967 C2 | 9/2005 |

*Primary Examiner* — Zachary T Dragicevich
(74) *Attorney, Agent, or Firm* — Corinne R. Gorski

(57) ABSTRACT

A drill string rod forms part of a drill string having one end configured with a male spigot portion to be received within a corresponding rod female sleeve end. To minimize stress concentrations within the threaded male and female coupling, the male spigot is configured with a large diameter or cross-sectional area being at least equal to the cross sectional area or diameter of the main length section.

13 Claims, 4 Drawing Sheets

(56) References Cited

U.S. PATENT DOCUMENTS

| | | | |
|---|---|---|---|
| 4,687,368 A | 8/1987 | Eklof et al. | |
| 6,212,763 B1 | 4/2001 | Newman | |
| 6,254,146 B1 * | 7/2001 | Church | E21B 17/042 |
| | | | 285/334 |
| 6,485,063 B1 | 11/2002 | Olivier | |
| 6,767,156 B1 | 7/2004 | Larsson | |
| 7,316,268 B2 * | 1/2008 | Peleanu | E21B 17/0426 |
| 2009/0279947 A1 * | 11/2009 | Pliska | E21B 17/042 |
| | | | 403/343 |

\* cited by examiner

US 10,584,545 B2

DRILL STRING WITH BEND RESISTANT COUPLING

RELATED APPLICATION DATA

This application is a § 371 National Stage Application of PCT International Application No. PCT/EP2014/068121 filed Aug. 27, 2014 claiming priority of EP Application No. 13183497.0, filed Sep. 9, 2013.

FIELD OF INVENTION

The present invention relates to a drill string rod to form part of a drill string having a bend resistant end coupling and in particular, although not exclusively, to a drill rod having a male spigot portion with a threaded section and an intermediate shank having an outside diameter, width and/or cross sectional area that is optimised to provide a desired stiffness when the drill string is exposed to bending moments.

BACKGROUND ART

Percussion drilling is used to create a long borehole via a plurality of elongate drill string rods coupled together end-to-end by interconnected male and female threaded ends. The well-established technique breaks rock by hammering impacts transferred from the rock drill bit, mounted at one end of the drill string, to the rock at the bottom of the borehole. Typically, the energy required to break the rock is generated by a hydraulically driven piston that contacts the end of the drill string (via a shank adaptor) to create a stress (or shock) wave that propagates through the drill string and ultimately to the base rock level. Conventional male and female threaded couplings are described in U.S. Pat. Nos. 4,332,502; 4,398,756; 4,687,368 and DE 2800887.

When the male and female threaded ends of neighbouring drill rods are coupled to create the drill string, the joint is typically subjected to bending forces during drilling. These bending moments fatigue the coupling and lead to breakage within the threaded portion of the joint. Typically, it is the threaded male spigot that is damaged and determines the operational lifetime of the coupling. U.S. Pat. No. 6,767,156 discloses a threaded joint between two percussive drill rods having conical guiding surfaces provided at the leading axial ends of the male and female portions in an attempt to achieve a secure couple and avoid damage to the threads.

However, conventional threaded couplings and in particular the respective threaded ends of existing drill rods comprise a male part of the coupling that has a smaller diameter than a main length of the rod. This provides a drill string having a uniform outer diameter but a compromised coupling strength that is typically weak during bending. Even where there is no bending (which is uncommon) the incoming compressive shock wave will create tension in the coupling due to reflection in the free end of the male part which may cause fracture in the highest stressed area. Accordingly, what is required is a drill string rod that addresses these problems.

SUMMARY OF THE INVENTION

It is a primary objective of the present invention to provide a drill string rod that provides a coupling region that exhibits enhanced stiffness during bending and that can withstand significant bending moments during use. It is a further objective to provide a drill string rod coupling configured to withstand non-symmetrical loading forces acting on the drill string and in particular the drill head as it is impacted against the rock at the bottom of the borehole. It is a further objective to provide a coupling for a drill rod that is resistant to bending waves in the drill string resultant from a non-central strike by a driven piston at the rearward-most drill rod or shank adaptor.

The objectives are achieved by providing a coupling for a drill rod having a main length section and a threaded male spigot portion that comprises an outside diameter, cross sectional area or width (in a plane perpendicular to a longitudinal axis of the drill rod) that is at least equal to an outside diameter of the main length section of the rod. In particular, the present drill rod comprises a male spigot portion provided at one end of the hollow elongate main length that comprises an externally threaded section extending from a non-threaded shank. The outside diameter, width or cross sectional area of the shank is specifically configured to be at least equal to a corresponding outside diameter or cross sectional area of the main length section along the full axial length of the shank. This is advantageous to provide a 'bending stiff' coupling to minimise stresses and stress concentrations within the male spigot part of the coupling. Advantageously, the cross sectional area or diameter of the shank does not decrease in an axial direction from the threaded section to the main length section and in contrast increases in diameter or cross sectional area towards the junction with the main length section. In particular, the shank flares radially outward at the junction with the main length section (or an annular shoulder provided at the end of the main length section) to optimise resistance to bending. Accordingly, the subject invention and in particular the male spigot configuration is suitable for 'shoulder contact' coupling arrangements.

According to a first aspect of the present invention there is a provided a drill string rod to form a part of a drill string, the rod comprising: a hollow elongate main length section extending axially between a first end and a second end; a male spigot portion provided at the second end having an externally threaded section and a non-threaded shank positioned axially intermediate the threaded section and a shoulder; the threaded section comprising at least one helical ridge and trough extending axially from the shank; the shoulder axially separating and projecting radially outward relative to the main length section and the spigot portion, the shank extending axially from an annular side surface of the shoulder, an axial length of the spigot portion configured such that the annular surface is capable of abutting an annular end surface of a female end portion of a neighbouring rod of the drill string; characterised in that: an outside diameter or width of the spigot portion including the shank and the helical ridge in a direction perpendicular to a longitudinal axis of the rod is equal to or more than the outside diameter of the main length section along a full axial length of the shank and the helical ridge.

Preferably, an internal bore extends axially through main length section and the spigot portion, the internal bore being of uniform internal diameter along a full axial length of the main length section and the spigot portion. Preferably the annular side surface is aligned perpendicular to the axis. Optionally, an outside diameter of the threaded section at a radial position corresponding to a helical trough is less than the outside diameter of the main length section. Such configurations act to further increase the stiffness during bending of the coupled joint and assists with minimising fatigue and the risk of breakage. Optionally, an outside diameter of the threaded section at a radial position corresponding to the trough is at least equal to the outside diameter of the main length section.

Optionally, the second end comprises a shoulder projecting radially outward relative to the main length section, the shank extending axially from one side of the shoulder.

Alternatively, the second end may be devoid or substantially devoid of a radially flared shoulder such that junction between the shank and the end of the main length section is substantially smooth and non-profiled. Where the present drill rod comprises a shoulder, an end of the shank that extends from the side of the shoulder comprises a diameter that increases in a direction from the threaded section to the shoulder. Preferably, an external shape profile of the shank is curved to flare radially outwardly in contact with the shoulder.

Optionally, an external surface of at least an axial section of the shank is aligned substantially parallel with a longitudinal axis of the rod. Advantageously, the substantially cylindrical shape profile of the shank (at a region along its axial length) comprises a cross sectional area or diameter that is not less than a cross sectional area or outer diameter of the main length section. Preferably, an outside diameter of the shank at a region along the length of the shank is substantially equal to the outside diameter of the threaded section at a radial position corresponding to the helical ridge.

Preferably, an axial length of the threaded section is greater than an axial length of the shank. Such a configuration is advantageous to achieve a desired coupling strength to withstand tensile forces through the coupling and bending moments. Preferably, a cross sectional area of the shank at an axial section immediately adjacent one side of the threaded section is at least equal to a cross sectional area of the main length section.

Preferably, the first end of the main length section comprises a female hollow portion having an internal threaded section to engage with the threaded section of the male spigot portion of a neighbouring rod of the drill string. Such a configuration is advantageous to maximise the coupling strength between adjacent drill rods. The coupling strength is further optimised with regard to tensile and bending forces by configuring an internal diameter of the threaded section of the female portion to be substantially equal to the outside diameter of the main length section.

Preferably, where the drill rod comprises an annular shoulder at the junction between the main length section and the male spigot end, an outside diameter of the female portion is substantially equal to an outside diameter of the shoulder.

According to a further aspect of the present invention there is provided a drill string comprising a drill string rod as claimed herein.

BRIEF DESCRIPTION OF DRAWINGS

A specific implementation of the present invention will now be described, by way of example only, and with reference to the accompanying drawings in which.

DETAILED DESCRIPTION OF PREFERRED EMBODIMENT OF THE INVENTION

Figure 1:
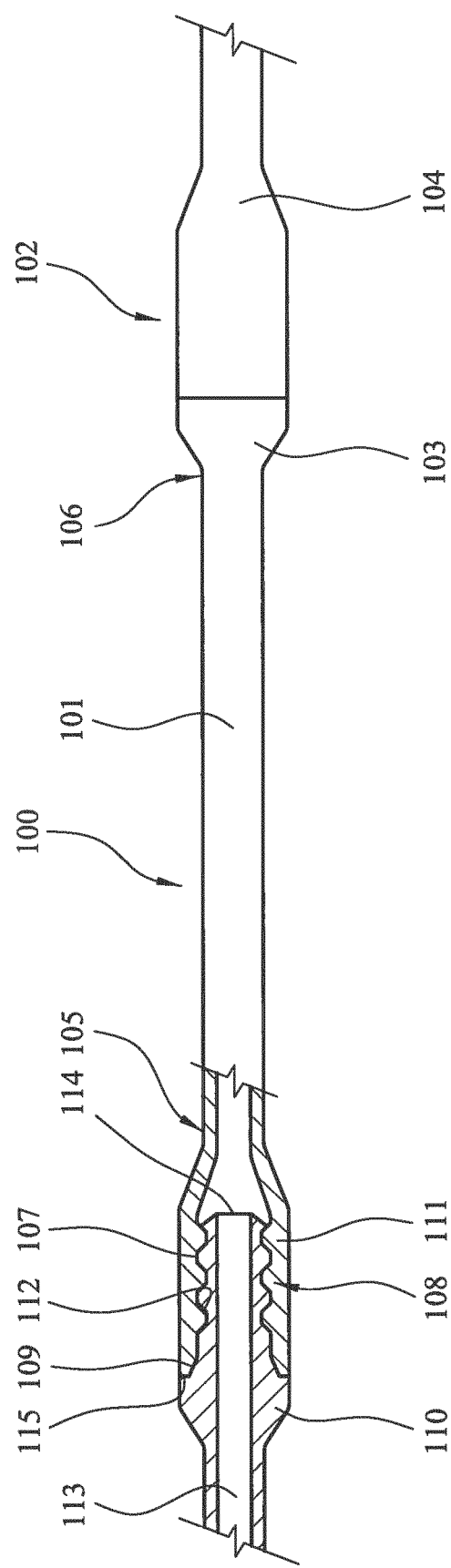
FIG. 1 is an external view of a drill string formed from a plurality of elongate drill rods connected end-to-end by cooperating male and female threaded couplings according to a specific implementation of the present invention.

Referring to FIG. 1, a drill string comprises a plurality of interconnected drill string rods 100. Each rod 100 comprises a main length section 101 having a first end 105 and a second end 106. An outside diameter of the main length section 101 increases at each end 105, 106 to form a radially flared end coupling region 103, 104 respectively. A part of each coupling end 103, 104 comprises a threaded portion to allow the ends 103, 104 to engage one another and form a secure threaded coupling 102 to interconnect a plurality of rods 100 to form the drill string. In particular, male end 103 comprises an annular shoulder 110 from which projects axially a male spigot 108. Spigot 108 is divided axially into an endmost threaded section 107 and a non-threaded shank 109 positioned axially intermediate threaded section 107 and shoulder 110. An internal bore 113 extends axially through main length section 101 and spigot 108 of uniform internal diameter. Female end 104 comprises a hollow sleeve 111 having cooperating threads 112 formed at the internal surface of the sleeve 111 so as to cooperate with the threaded turns of the male threaded section 107. When the male and female ends 103, 104 are coupled, an axially endmost annular surface 115 of the female sleeve 111 abuts against shoulder 110 such that an annular end face 114 of male spigot 108 is housed fully within sleeve 111.

Figure 2:
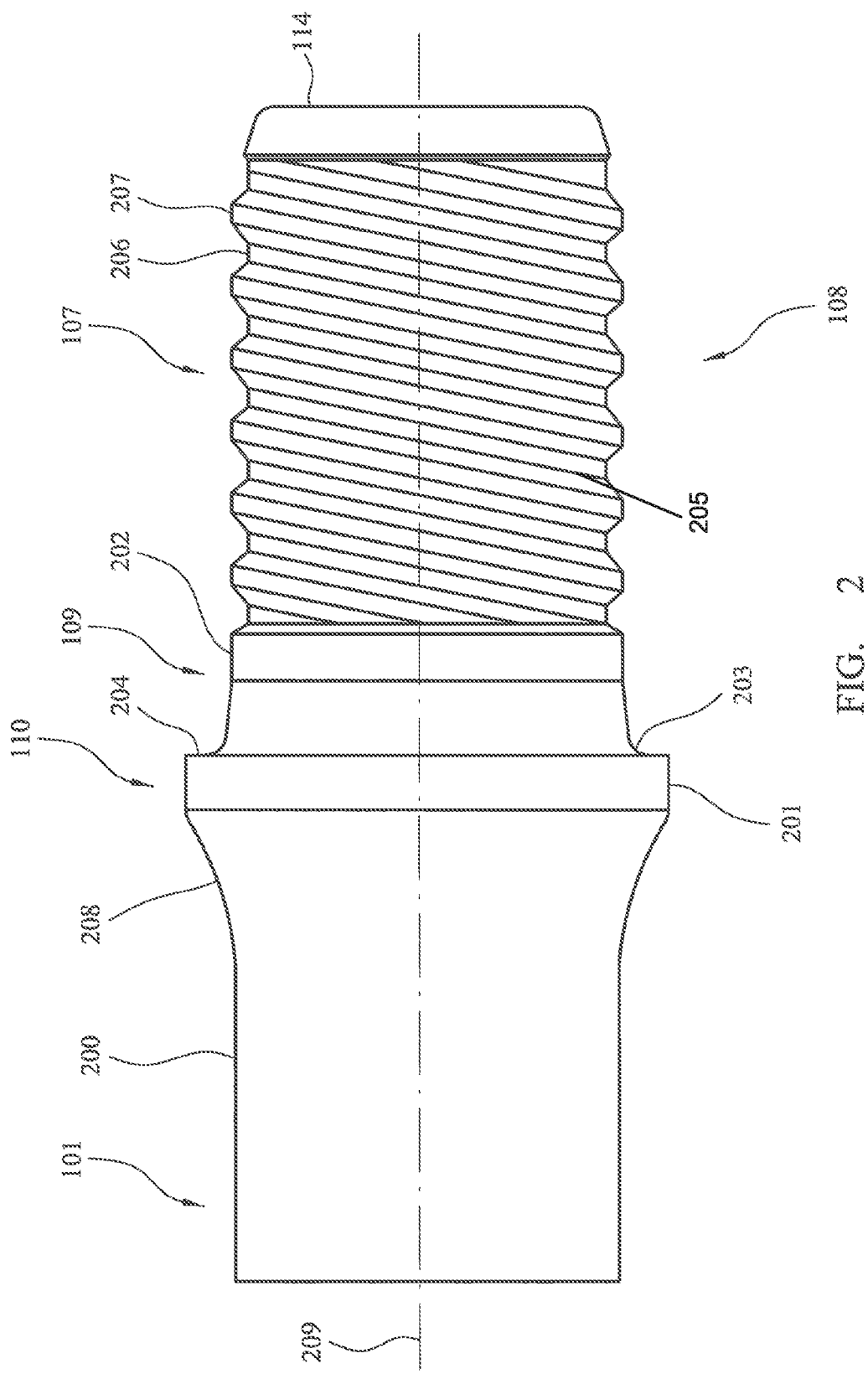
FIG. 2 is an external perspective view of a second end of a drill rod of the string of FIG. 1 in which the threaded male spigot end comprises a shank portion that is strengthened to be resistant to bending and tensile forces according to a specific implementation of the present invention.

Referring to FIG. 2, male spigot 108 is configured to comprise generally an outside diameter that is approximately equal to an outside diameter of main length section 101 along the axial length of spigot 108. Similarly, a cross sectional area in a plane perpendicular to a longitudinal axis 209 at the external surface 200 of main length section 101 is approximately equal to a cross sectional area in a parallel plane extending through spigot 108 and generally at threaded section 107.

External surface 200 of main length section 101 tapers radially outward at region 208 to form annular shoulder 110 having an annular external surface 201 defining an axially short cylindrical section. Shoulder 110 terminates at an opposite side of region 208 in a side surface 204 aligned perpendicular to axis 209. Spigot 108 projects axially from side surface 204 and comprises a first transition region 203 that is flared radially outward in contact with side surface 204 and a second transition region 202 in contact with threaded section 107. That is, the cross sectional area (in the plane perpendicular to axis 209) and the diameter of the shank 109 at region 203 decreases from side surface 204 to the second transition region 202. The cross sectional area and the diameter of the shank 109 is then substantially uniform over the second transition region 202 axially between the first transition region 203 and threaded section 107. Second transition region 202 is terminated by at least one helical turn 205 that extends axially from the second transition region 202 to spigot end face 114. Accordingly, threaded section 107 comprises a helically extending ridge 207 and a corresponding helically extending groove or trough 206. According to the specific implementation, a cross sectional area (in the plane perpendicular to axis 209) and a diameter of threaded section 107 at an axial and radial position corresponding to ridge 207 is approximately equal to the cross sectional area and outside diameter of main length section 101. The radial position of the outer surface at ridge 207 is also substantially equal to the radial position of the shank outer surface at second transition region 202 relative to axis 209. As such, spigot 108 may be considered to be an axial extension of main length section 101 being axially divided by shoulder 110. An axial length of shank 109 is less than a corresponding axial length of threaded section 107. Additionally, an axial length of first transition region 203 is approximately equal to an axial length of second transition region 202 with both regions 202, 203 being relatively non-profiled and devoid of threads 205.

Figure 3:
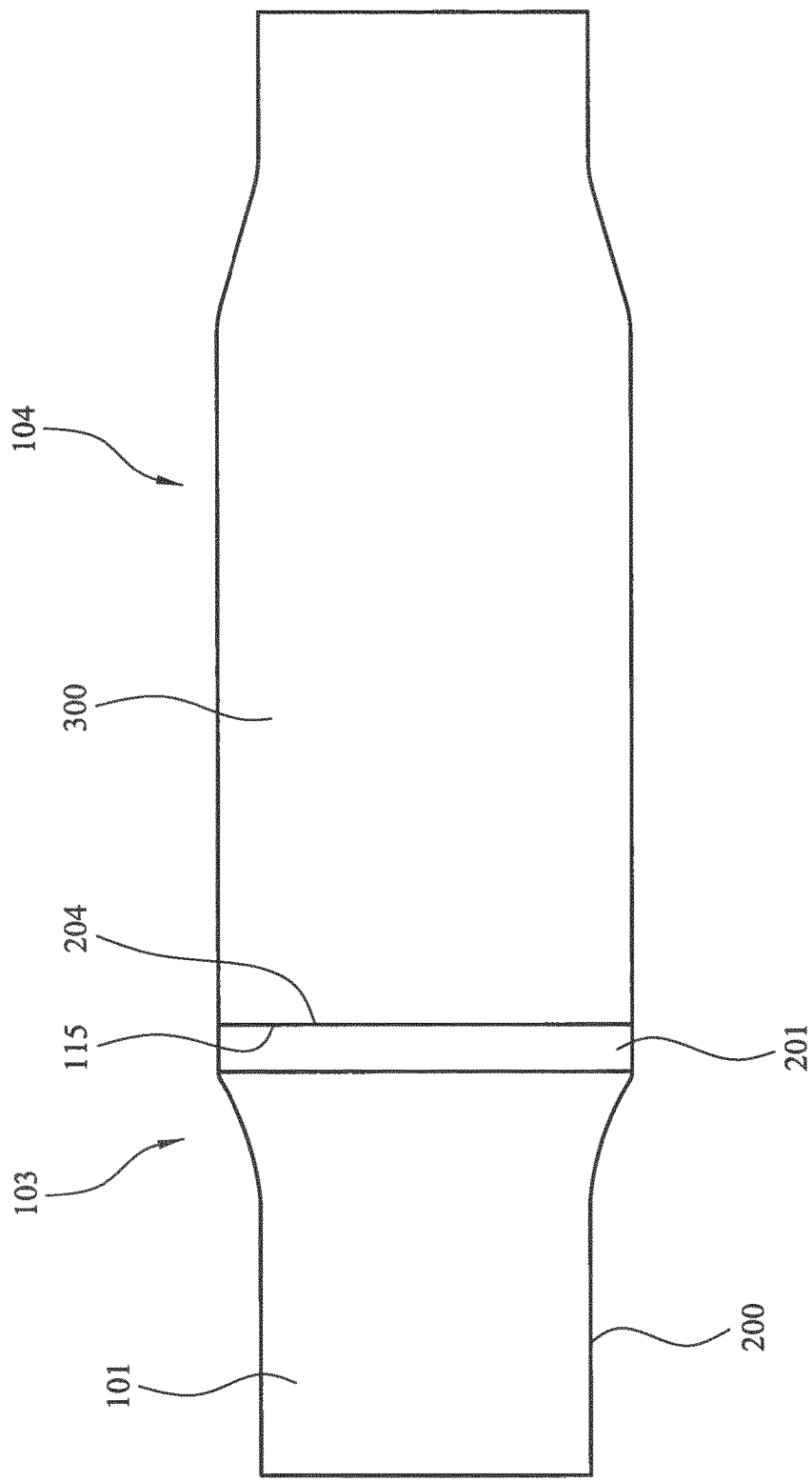
FIG. 3 is an external view of the coupling region between drill rods of the string of FIG. 1 in which a female threaded coupling portion is oversized relative to an outside diameter of the main length section of the drill rod to provide a generally oversized coupling region in a radial direction.

Referring to FIG. 3, the radially enlarged male spigot 108 necessitates a radially enlarged female sleeve 111 having an outside diameter and cross sectional area substantially equal to the outside diameter and cross sectional area at shoulder 110 (in the plane perpendicular to axis 209). Accordingly, the external surface 300 of sleeve 111 is aligned flush with the external surface 201 of shoulder 110 when the male and female ends 103, 104 are mated together and in particular when annular side surface 204 is abutted by annular end surface 115 of sleeve 111. The larger diameter coupling (relative to conventional couplings) provides an increased cross sectional area in the critical transition region between drill rods 100 that is effective to reduce the tensile stress within the coupling region resultant from the incoming compressive stress wave generated by the piston. Additionally, the stress concentrations are minimised as a relative difference between the outside diameter at shoulder 110 and shank 109 are minimised as far as possible whilst providing a contact surface region 204 for abutment by sleeve end 115. Gradually increasing the cross sectional area from the second shank transition region 202 through the first shank transition region 203 and into contact with side surface 204 is advantageous to maximise stiffness of a coupling during bending and to minimise stress concentrations in the male spigot 108 in response to both bending moments and tensile forces.

Figure 4:
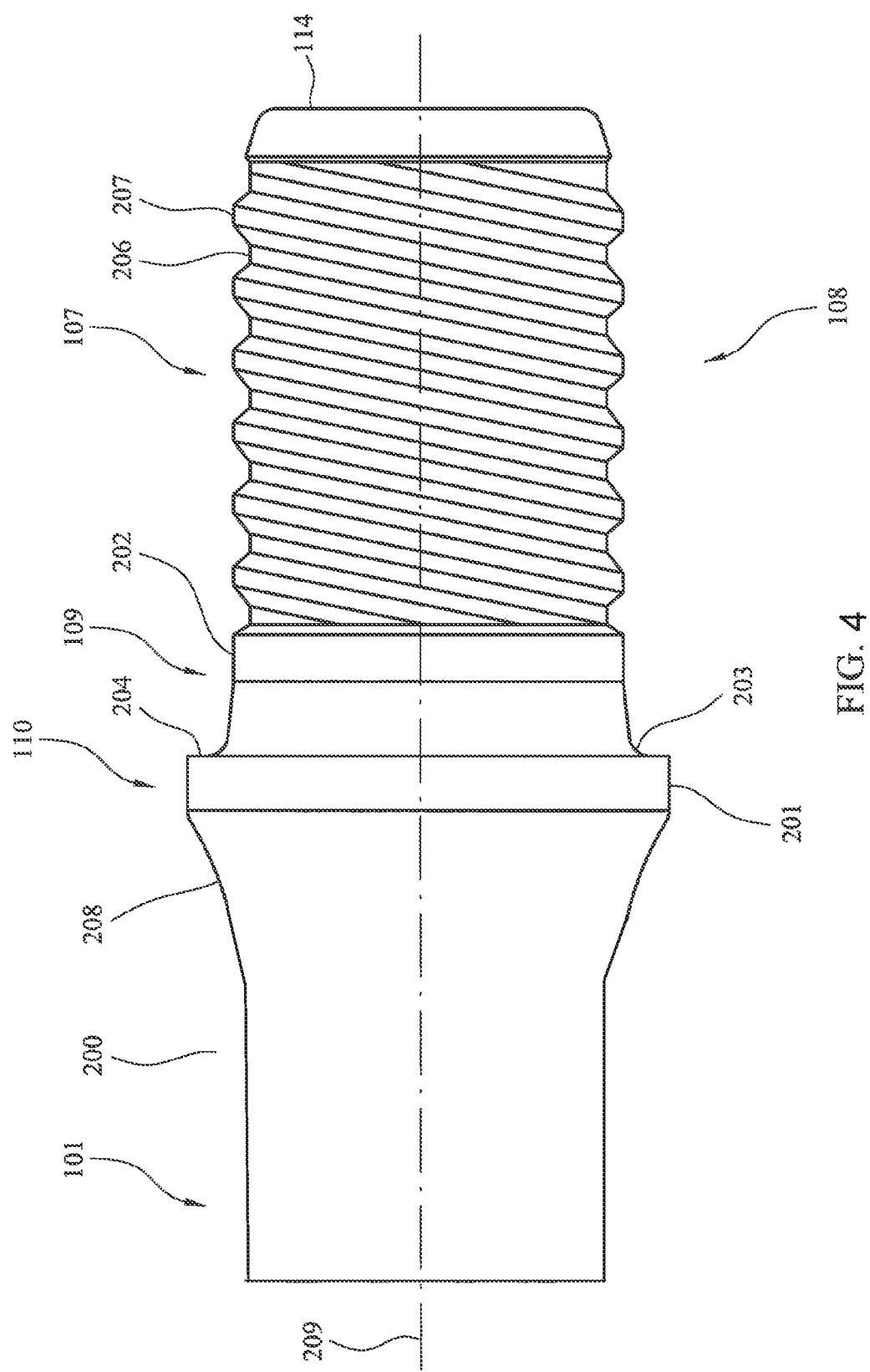
FIG. 4 is an external perspective view of a second end of a drill rod of the string of FIG. 1 in which an outside diameter of the threaded section at a radial position corresponding to the trough is at least equal to or less than the outside diameter of the main length section

According to further specific implementations, the generally cross sectional area of the male spigot 108 may be greater than the diameter of cross sectional area of the main length section 101 to further increase the stiffness of the coupling during bending. Optionally, as shown in FIG. 4, an outside diameter of the threaded section at a radial position corresponding to the trough is at least equal to or less than the outside diameter of the main length section.

The invention claimed is:

1. A drill string rod arranged to form a part of a drill string, the rod comprising:
   a hollow elongate main length section extending axially between a first end and a second end;
   a male spigot portion provided at the second end having an externally threaded section and a non-threaded shank positioned axially intermediate the threaded section and a shoulder, the threaded section including at least one helical ridge and trough extending axially from the shank, wherein the shoulder axially separates the threaded section and the main length section and projects radially outward relative to the main length section and the spigot portion, the shank extending axially from an annular side surface of the shoulder, the annular side surface being aligned perpendicular to a longitudinal axis of the rod, an axial length of the spigot portion being configured such that the annular surface is arranged to abut an annular end surface of a female end portion of a neighbouring rod of the drill string; and
   an outside diameter or width of the shank in a direction perpendicular to the longitudinal axis of the rod being equal to or more than the outside diameter of the main length section along a full axial length of the shank, an external shape profile of the shank being curved to flare radially outwardly and transition into the annular side surface, wherein an internal bore extends axially through main length section and the spigot portion, the internal bore having a uniform internal diameter along at least a full axial length of the main length section.

2. The rod as claimed in claim 1, wherein the internal bore has a uniform internal diameter along a full axial length of the main length section and the spigot portion.

3. The rod as claimed in claim 1, wherein an outside diameter of the threaded section at a radial position corresponding to a helical trough is less than the outside diameter of the main length section.

4. The rod as claimed in claim 1, wherein an outside diameter of the threaded section at a radial position corresponding to the at least one helical ridge of the trough is equal to the outside diameter of the main length section.

5. The rod as claimed in claim 1, wherein an end of the shank that extends from the shoulder includes a diameter that increases in a direction from the threaded section to the shoulder.

6. The rod as claimed in claim 1, claim wherein an external surface of at least an axial section of the shank is aligned substantially parallel with a longitudinal axis of the rod.

7. The rod as claimed in claim 1, wherein an outside diameter of the shank at a region along the length of the shank is substantially equal to the outside diameter of the threaded section at a radial position corresponding to the helical ridge.

8. The rod as claimed in claim 1, wherein an axial length of the threaded section is greater than an axial length of the shank.

9. The rod as claimed in claim 1, wherein a cross sectional area of the shank at an axial section immediately adjacent one side of the threaded section is at least equal to a cross sectional area of the main length section.

10. The rod as claimed in claim 1, wherein the first end of the main length section includes a female hollow portion having an internal threaded section to engage with an external threaded section of a male spigot portion of a neighbouring rod of the drill string.

11. The rod as claimed in claim 10, wherein an internal diameter of the threaded section of the female portion is substantially equal to the outside diameter of the main length section.

12. The rod as claimed in claim 10, wherein an outside diameter of the female portion is substantially equal to an outside diameter of the shoulder.

13. A drill string comprising a drill string rod including a hollow elongate main length section extending axially between a first end and a second end, a male spigot portion provided at the second end having an externally threaded section and a non-threaded shank positioned axially intermediate the threaded section and a shoulder, the threaded section including at least one helical ridge and trough extending axially from the shank, the shoulder axially separating the threaded section and the main length section and projecting radially outward relative to the main length section and the spigot portion, the shank extending axially from an annular side surface of the shoulder, the annular side surface being aligned perpendicular to a longitudinal axis of the rod, an axial length of the spigot portion being configured such that the annular surface is arranged to abut an annular end surface of a female end portion of a neighbouring rod of the drill string, and an outside diameter or width of the shank in a direction perpendicular to the longitudinal axis of the rod being equal to or more than the outside diameter of the main length section along a full axial length of the shank, an external shape profile of the shank being curved to flare radially outwardly and transition into the annular side surface, wherein an internal bore extends axially through main length section and the spigot portion, the internal bore having a uniform internal diameter along a full axial length of the main length section.

* * * * *